United States Patent [19]

Austin

[11] Patent Number: 5,406,150
[45] Date of Patent: Apr. 11, 1995

[54] CONTROL SYSTEM FOR MOTORS AND INDUCTIVE LOADS

[76] Inventor: Charles C. Austin, 26416 San Ramon Way, Mission Viejo, Calif. 92692

[21] Appl. No.: 934,860

[22] Filed: Aug. 24, 1992

[51] Int. Cl.⁶ .......................................... H03K 17/687
[52] U.S. Cl. .................... 327/110; 318/599; 327/87; 327/427
[58] Field of Search .............. 307/263, 571, 253, 359, 307/228, 265, 270, 570; 318/599; 388/804, 805, 811, 812

[56] References Cited

U.S. PATENT DOCUMENTS

| | | | |
|---|---|---|---|
| 4,446,440 | 5/1984 | Bell | 330/10 |
| 4,469,082 | 9/1984 | Nishitoba et al. | 307/359 |
| 4,591,767 | 5/1986 | Koide | 318/314 |
| 4,607,210 | 8/1986 | Ohms et al. | 307/571 |
| 4,791,350 | 12/1988 | Roof | 307/571 |
| 4,904,889 | 2/1990 | Chieli | 307/253 |
| 4,985,687 | 1/1991 | Long | 331/158 |
| 5,045,766 | 9/1991 | Vermersh | 318/293 |
| 5,061,863 | 10/1991 | Mori et al. | 307/350 |
| 5,099,138 | 3/1992 | Fukunaga | 307/254 |

Primary Examiner—Timothy P. Callahan
Assistant Examiner—Toan Tran
Attorney, Agent, or Firm—Hecker & Harriman

[57] ABSTRACT

The present invention provides a system for controlling current through inductive elements by automatically switching between a pulse width modulation mode and a linear mode, depending upon the current demands of the inductive elements. A time-base circuit provides periodic pulses that allow current to flow through an inductive device. The current through the inductive device increases over time. If the current through the inductive device exceeds a specified value, the current is shut off until the next pulse from the time-base circuit. After the power supply current has been shut off, current through the inductive device continues to flow through flyback diodes, gradually decreasing over time. Another pulse is provided by the time-base circuit before the current is allowed to reach zero. By controlling the duration and rate of increase and decrease of current through the inductive device, a method of current control for inductive elements has been provided.

15 Claims, 6 Drawing Sheets

CONTROL SYSTEM FOR MOTORS AND INDUCTIVE LOADS

BACKGROUND OF THE INVENTION

1. Field of the Invention

This invention relates to the field of control systems for inductive electrical loads, including motors, and in particular, to controlling the amount of current flowing through an inductive load.

2. Background Art

Electrical circuits often include inductive components. In some circuits, the amount of current required by the inductive components varies over time. To optimize performance of an electrical system and components such as power supplies and switching devices, it may be desirable to limit the amount of current which may flow through inductive components.

Motors are one type of inductive component for which it is desirable to control operating current. In the prior art, two methods have been used to control current in motors. One prior art method is known as linear control. Linear current control allows a steady current to flow at a controlled level. A second method of the prior art is known as pulse width modulation (PWM). Pulse width modulation causes current to be applied in pulses of a fixed level. Pulse width modulation allows current to be controlled by varying the width of the pulses. By switching current fully on or fully off, pulse width modulation achieves great efficiency by avoiding losses associated with linear current control. However, by generating pulses, pulse width modulation can introduce electrical and acoustic noise into the systems in which it is employed. Such noise can interfere with other components of the system and can annoy the users of the system.

Certain prior art motor controllers have allowed operation of motors in either the linear or PWM modes. However, these motor controllers do not allow automatic selection of linear or PWM operation. The operating mode of the controller (linear or PWM) must be selected by circuits external to the controller circuit and thus, the controller may be in the linear mode when it should be in the PWM mode, resulting in decreased efficiency. Also, the motor may be in the PWM mode when it should be left in the linear mode, increasing the presence of noise in the system.

One prior art motor controller is the Micro Linear ML4411. The ML4411 allows linear and PWM operation, but uses variable frequency PWM, which requires a one-shot timing circuit. Also, the ML4411 requires upper and lower drivers of opposite semiconductor-type polarities.

SUMMARY OF THE PRESENT INVENTION

The present invention provides a system for controlling circuits that contain inductive elements. Since the present invention allows operation in either the linear or PWM mode, it avoids the disadvantages of operating in only one of the two modes. Since the present invention does not use the constant off time variable frequency PWM method of the prior art, it avoids some of the noise problems and complexities associated with variable frequency PWM. Also, the present invention allows automatic switching between the PWM mode and linear mode, depending upon the current demands of the inductive device.

In the present invention, current through the inductive device is measured and compared to a specified value. A time-base circuit provides periodic pulses that allow current to flow through the inductive device. The current through the inductive device increases over time. If the current through the inductive device exceeds the specified value, the current is shut off until the next pulse from the time base circuit. Thus, when the inductive device demands a large amount of current, the current will exceed the specified value, and only a short pulse of current will be applied over that timing cycle. However, if the inductive device draws less current, the current will not exceed the specified value as quickly. Thus, a longer pulse of current will be allowed to flow during that timing cycle. If the inductive device draws even less current, the amount of current may not exceed the specified value over the entire timing cycle. In this case, the current will be allowed to flow continuously for the duration of the timing cycle and into subsequent timing cycles.

In the preferred embodiment of the present invention, control of current through motor windings is provided. Many motor applications require larger amounts of current while the motor is starting and accelerating and use less current when operating "at speed"(at normal operating speed). With the present invention, the current required for starting and acceleration can be limited using pulse width modulation. As the motor reaches "at speed" operation, the controller automatically switches to linear mode operation to reduce operating noise.

The preferred embodiment of the present invention also allows commutation switching to be performed with the same switching elements used for pulse width modulation. The preferred embodiment of the present invention also generates timing signals to coordinate back-EMF comparison with PWM switching. Also, the present invention is not limited to use with switching devices of opposite semiconductor polarities, but may be practiced with switching devices of a single semiconductor polarity.

Since the present invention provides adaptive linear and PWM current control for inductive loads without complicated circuitry, a much simpler, quieter and more efficient method of current control for inductive loads has been provided.

DETAILED DESCRIPTION OF THE PRESENT INVENTION

A control system for motors and inductive loads is described. In the following description, numerous specific details, such as conductivity type, motor type, etc., are described in detail in order to provide a more thorough description of the present invention. It will be apparent, however, to one skilled in the art, that the present invention may be practiced without these specific details. In other instances, well known features have not been described in detail so as not to obscure the present invention.

Figure 1:
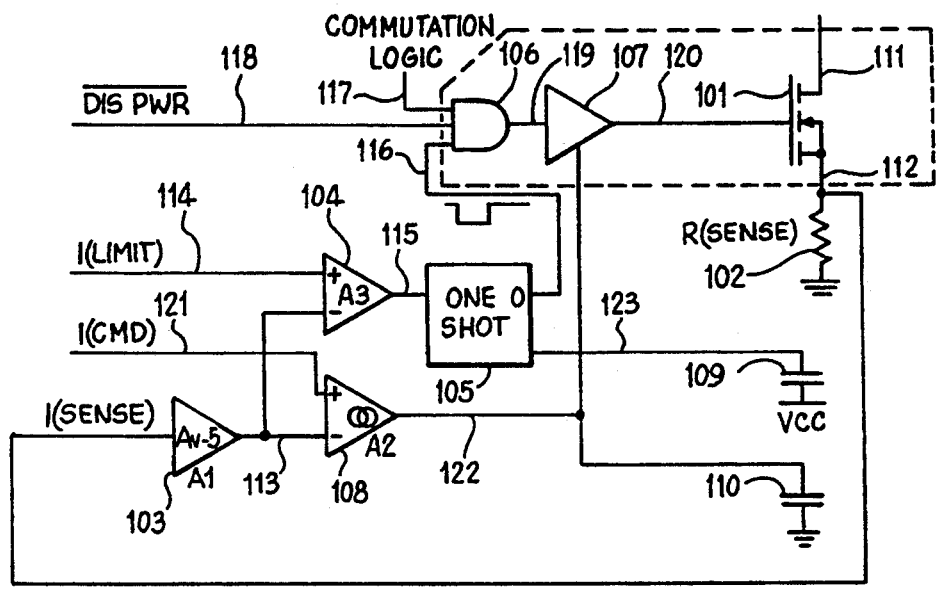
FIG. 1 is a schematic diagram illustrating a prior art circuit for linear and PWM operation.

An example of a prior art circuit for linear and PWM modulation is illustrated in FIG. 1. A commutation logic signal 117 and a DISPWR signal 118 are provided as inputs to AND gate 106, along with the output 116 of one-shot multivibrator 105. The output 119 of the AND gate 106 is coupled to buffer 107. The output 120 of buffer 107 is coupled to driver 101. Port 112 of driver 101 is coupled through sensing resistor 102 to ground and to the input of amplifier 103. Port 111 is coupled to one of a plurality of inductive loads (not shown) coupled in a star configuration. Additional elements (not shown), identical to elements 106, 107 and 101 of FIG. 1, are coupled in a similar fashion to drive the other inductive loads.

A current limit signal 114 is coupled to the non-inverting input of amplifier 104. The output 113 of amplifier 103 is coupled to the inverting input of amplifier 104. The output 115 of amplifier 104 is coupled to one-shot 105. The timing of one-shot 105 is controlled by capacitor 109 coupled on line 123 to one-shot 105 and to VCC.

Signal 121 (I(CMD)) is coupled to the non-inverting input of amplifier 108. Output 113 of amplifier 103 is coupled to the inverting input of amplifier 108. The output 122 of amplifier 108 is coupled through capacitor 110 to ground and to buffer 107.

The control circuit of the prior art includes a linear control loop and a PWM control loop. The linear control loop senses the motor current on the ISENSE terminal of amplifier 103 through sensing resistor 102. The internal current sense amplifier (108) output modulates the gate of N-channel MOSFET 101 via buffer 107. Buffer 107 has a totem pole output capable of sourcing and sinking up to 10 milliamps to drive the gate of FET 101.

The circuit also includes a current mode constant off time PWM circuit. When motor current builds to the threshold set on ILIMIT 114, the one-shot 105 is triggered (with timing set by capacitor 109). The current in the motor is then controlled by the lower of signals 114 and 121.

Figure 2:
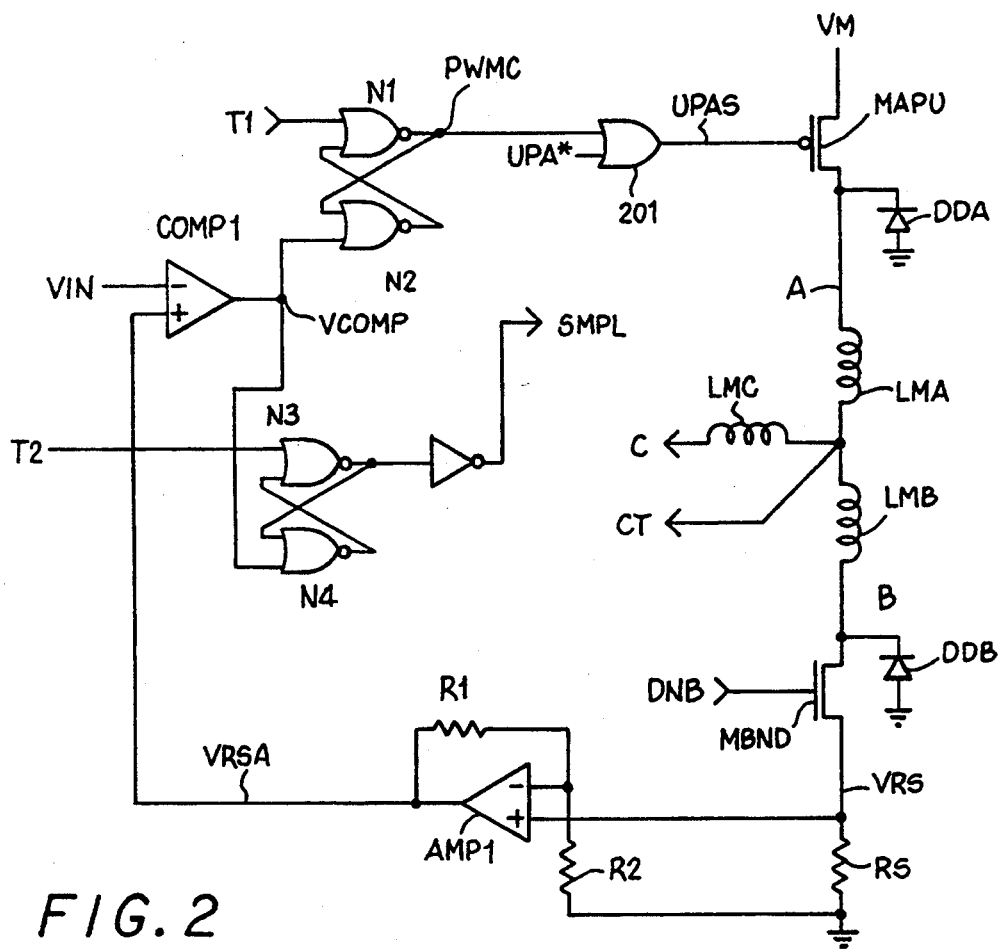
FIG. 2 is a schematic diagram illustrating the preferred embodiment of the present invention.

The preferred embodiment of the present invention is illustrated in FIG. 2. Two timing signals, T1 and T2, are generated by a time-base circuit (not shown). T1 is coupled to one input of NOR gate N1. The other input of NOR gate N1 is the output of NOR gate N2. The output of NOR gate N1 is signal PWMC and is coupled to one input of OR gate 201 and to one input of NOR gate N2. The other input of OR gate 201 is a signal UPA* (this signal is active low). The output UPAS of OR gate 201 is coupled to the gate of P-type drive transistor MAPU. The source of transistor MAPU is coupled to voltage VM. The drain of transistor MAPU is coupled to node A and through diode DDA to ground.

A VIN signal is coupled to the inverting input of comparator COMP1. The output of comparator COMP1 is coupled to node VCOMP. VCOMP is coupled to one input of NOR gate N2 and to one input of NOR gate N4. Timing signal T2 is coupled to NOR gate N3 along with the output of NOR gate N4. The output of NOR gate N3 is coupled to the other input of NOR gate N4 and is inverted to provide signal SMPL.

Node A is coupled to motor coil LMA. Motor coil LMC is coupled to the junction of coils LMA and LMB, as is control signal CT. One terminal of motor coil LMB is coupled at node B to diode DDB (the other side to ground), and the drain of drive transistor MBND. The gate of drive transistor MBND is coupled to signal DNB. The source of transistor MBND is coupled to voltage VRS. Voltage VRS is coupled to the non-inverting input of amplifier AMP1 and through resistor RS to ground. Resistor R2 is coupled between the inverting input of amplifier AMP1 and ground. The output of amplifier AMP1 is coupled in a feedback loop through resistor R1 to the inverting input. The output of amplifier AMPI is signal VRSA and is coupled to the non-inverting input of comparator COMP1.

Not shown in FIG. 2 are: MAND and MCND transistors coupling nodes A and C, respectively, to VRS, similar to MBND; NOR gate 201B coupled to a transistor MBPU for coupling node B to VM, and similarly, NOR gate 201C coupled to a transistor MCPU for coupling node C to VM; and a diode DCC, similar to DDA and DDB, for coupling node C to ground.

Figure 3:
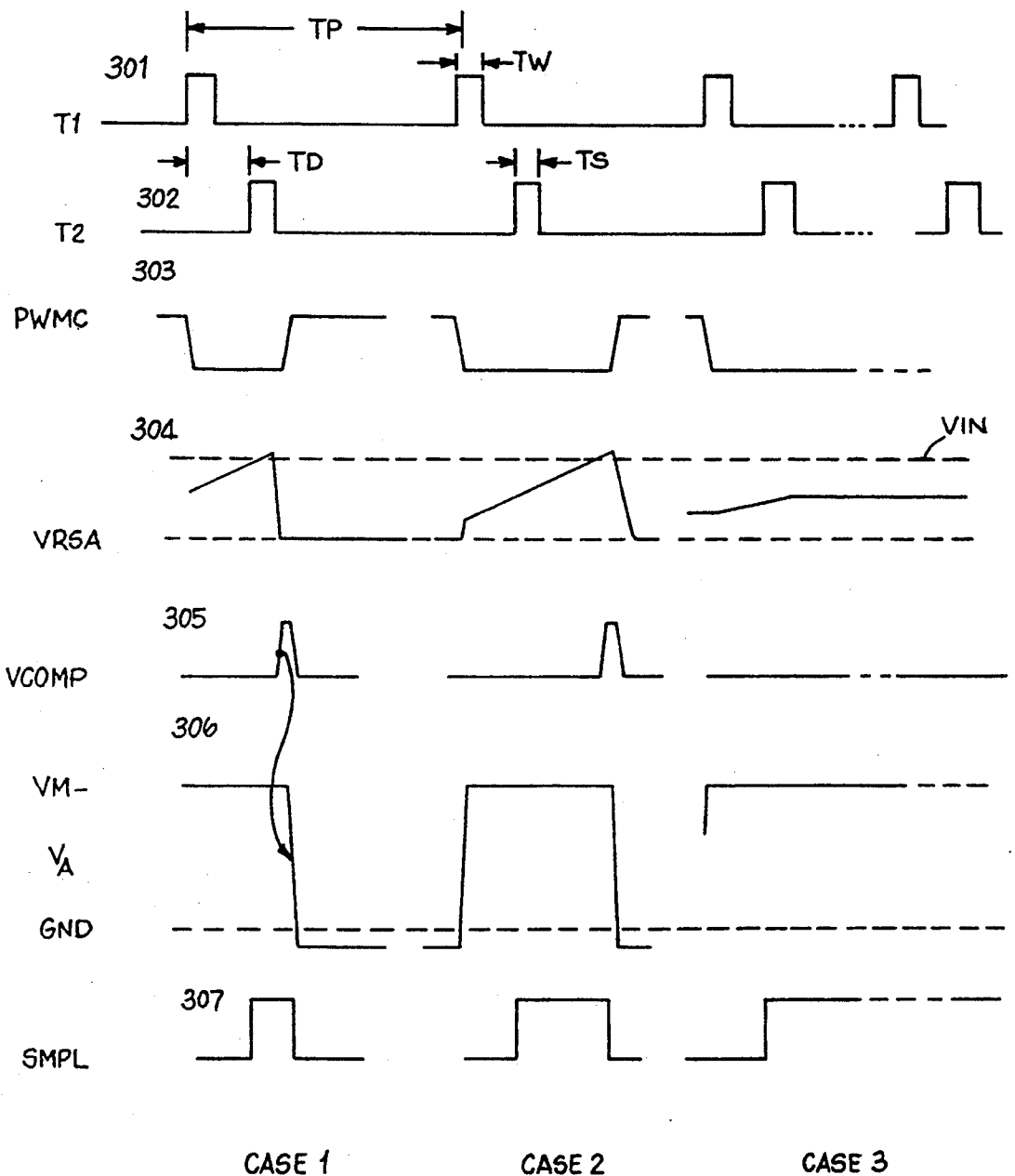
FIG. 3 is a timing diagram illustrating the timing relationships of the preferred embodiment illustrated in FIG. 2.

As noted above, signals T1 and T2 are generated by a time-base circuit that is not shown. Referring briefly to FIG. 3, the rate of T1 is such that TP is approximately 20–100 microseconds. The width of T1 (TW) is approximately 1–5 microseconds, and the width of T2 (TS) is similar. The delay of T2 from T1 (TD) is typically 10–20 microseconds in the preferred embodiment of the present invention.

T1 forces the output (PWMC) of NOR gate N1 to the low state. Assuming VCOMP is low, PWMC stays low after T1 goes low, and for UPA* low, the drive transistor MAPU is turned on (since it is a P-channel MOSFET).

With DNB, the gate signal to drive transistor MBND at a high potential, MBND is also on and current flows through the coils LMA and LMB. Because these coils are inductors, the current increases in value over time. The current flow (and flow increase) shows as VSRA, the amplified version of VRS. When VRSA is greater than voltage VIN, comparator COMP1 causes VCOMP to go high, and through the action of NOR gate N2, forces PWMC high. This, in turn, drives transistor MAPU to be off and interrupts current flow from the power supply VM. The inductive load forces a continuation of current flow through diode DDA. This can be seen in case 1 of FIG. 3.

Referring to FIGS. 2 and 3, case 2 of FIG. 3 shows a similar sequence, except that the time it takes for VRSA to reach VIN is a larger fraction of time (TP), the time between T1 events. Case 3 shows a third possibility, where the current never reaches a value such that VRSA exceeds VIN for a time span of one or more T1 events. In this case, PWMC stays low, the drive transistor MAPU stays on continuously and the switch mode operation is not required, since the motor current never reaches the limit value. Also shown in FIG. 2 is a sampling signal SMPL, to be used to determine motor position for commutation of motors that do not include HALLSENSE systems. Timing signal T2 is provided such that when the motor coils are switched "on" during switch mode operation, after delay TD, the coil not driven can be sampled at node C and compared to node CT, also sampled. As shown, the sample begins at TD after T1 and continues until VCOMP goes high. This is when the drive transistor is turned off. Thus, in case 3 where the switch mode operation is not required, the sample output SMPL stays high and allows continuous comparisons to be made, in the identical manner of linear operation, without any form of additional control circuitry.

Referring to FIG. 3, signal T1 is represented by timing line 301. Time TP is represented by consecutive rising edges of pulses of T1. TW is represented by the width of each pulse. T2 is represented by timing line 302 of FIG. 3. TS is represented by the width of each pulse of T2. Time TD is the difference between the rising edge of a pulse of T1 and the rising edge of a pulse of T2. The PWMC signal is represented by timing Line 303 of FIG. 3. Signal VRSA is represented by line 304. The peak of timing line 304 represents signal VRS. VCOMP is represented by timing line 305. The signal at A is represented by timing line 306 and the sample signal is represented by timing line 307.

Figure 4:
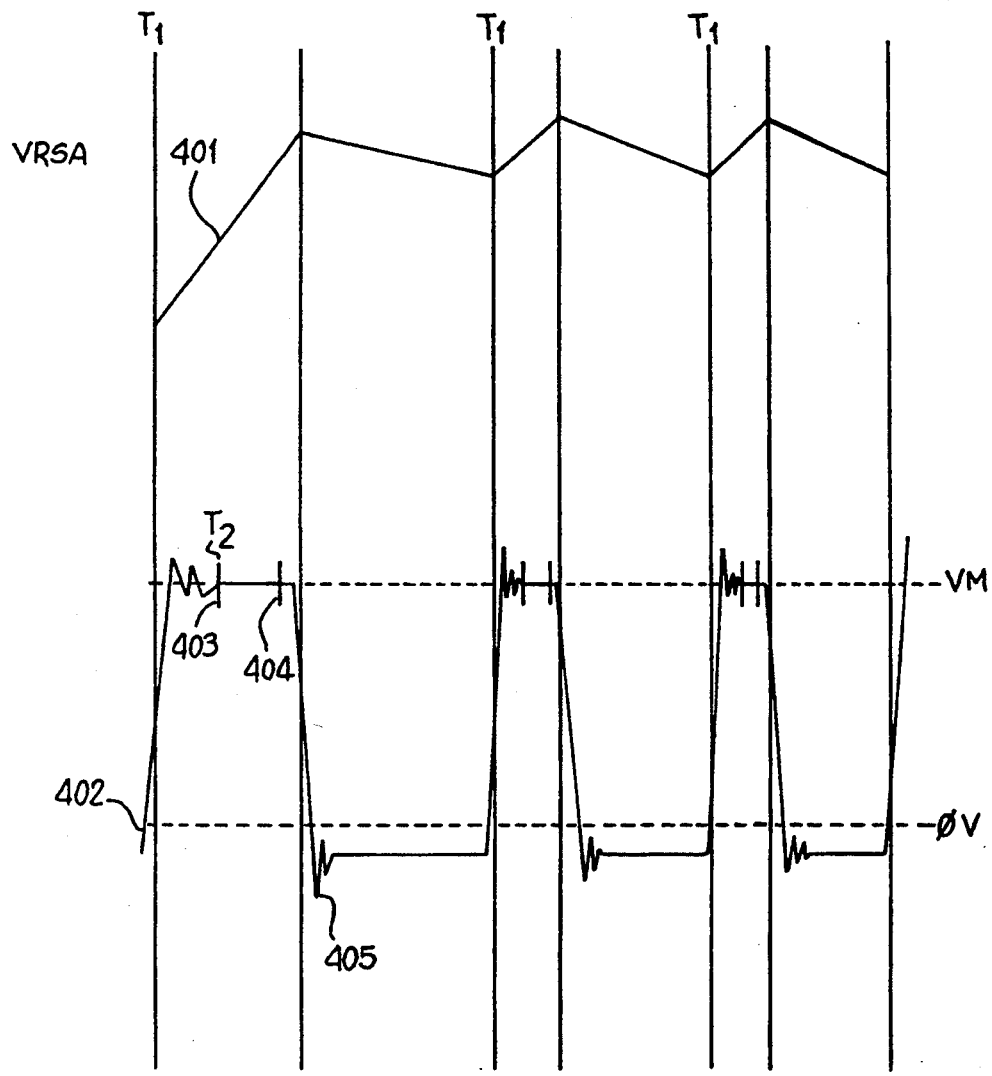
FIG. 4 is a timing diagram illustrating current and voltage through active motor windings of a motor controlled by the preferred embodiment of the present invention.

FIG. 4 is a timing diagram illustrating current and voltage through active motor windings of the motor controlled by the preferred embodiment of the present invention. Line 401 represents the voltage. VRSA and line 402 represents the voltage at node A. When T1 is pulsed, the PWMC node is forced down and the P-channel transistor is turned on. The voltage across a motor winding switches to VM. When the voltage VRSA exceeds a start voltage VIN, NOR gates N1 and N2 are switched so that the drive transistor is turned off. The voltage drop across the diode DDA is much less than VM, so that by the time T1 occurs again, coil current has not decayed as much as it had built up because of the voltage difference between VM and DDA. Therefore, in later cycles, VRS builds up sooner than the full length of the T1 (for example, 50-100 microseconds). Thus, the system provides a means for limiting current and operates with any inductive load.

For application with motors, particularly back-EMF sensing motors, a sample is taken of the undriven coil. Referring to signal 402, the optimum time to obtain the sample is after the ringing has subsided. At time T2, after the ringing has subsided, a sample gate is opened. The sample gate is closed just prior to turning the upper driver (MAPU) off. When MAPU is turned off, the voltage drops to one diode drop below ground with some ringing as illustrated at region 405. If the voltage VRS builds up slowly, i.e., longer than time $T_p$, MAPU is not turned off and the current remains on. In one mode shown as case 3, VRS never exceeds VS and the current remains on continuously during the commutation period so there is no pulse width modulation. In this situation, the system automatically reverts to normal unswitched operation.

Figure 5:
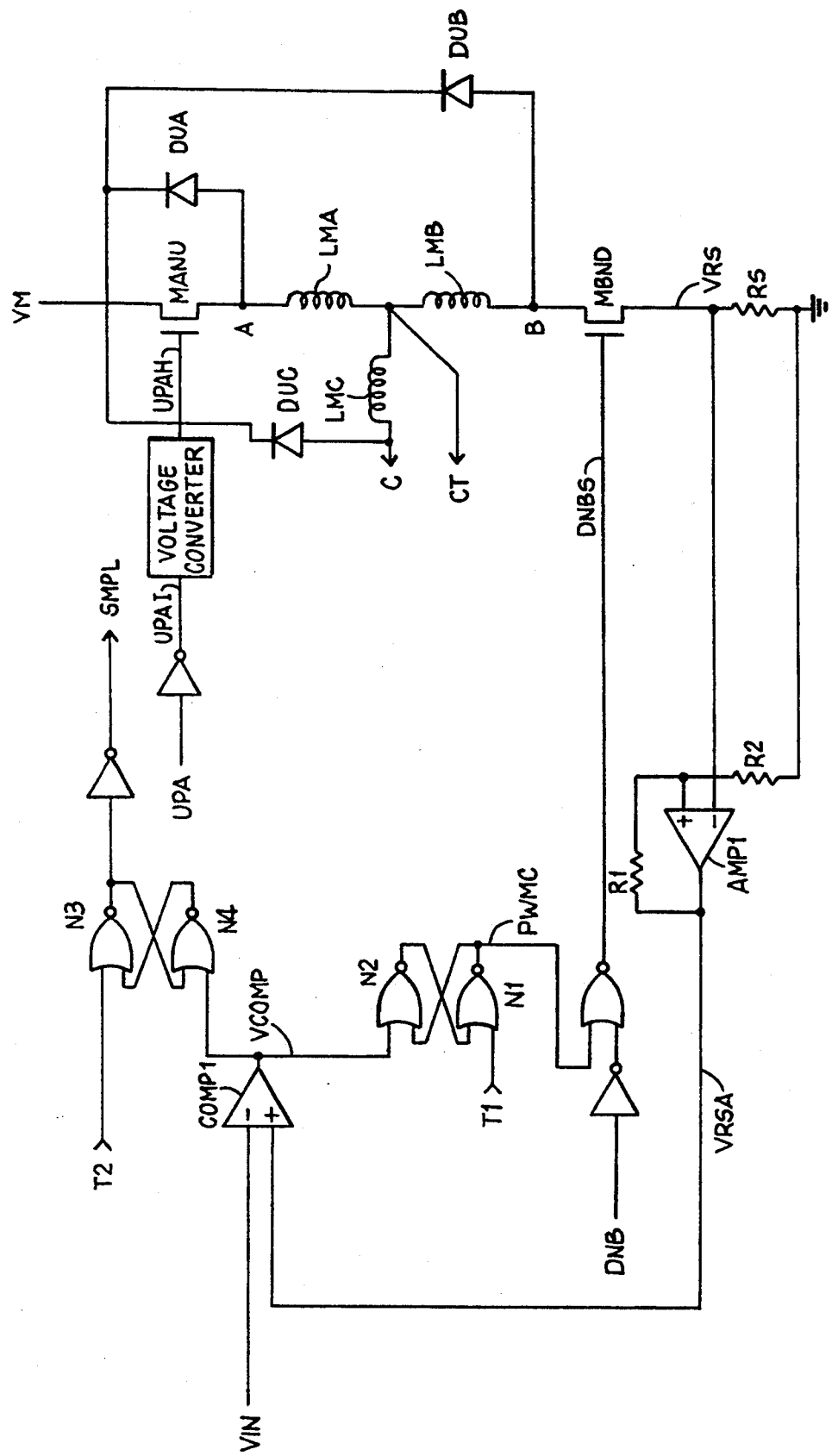
FIG. 5 is a schematic diagram illustrating an alternate embodiment of the present invention.

An alternate embodiment of the present invention is illustrated in FIG. 5. FIG. 5 is similar to the embodiment of FIG. 2. However, diodes DUA, DUB and DUC are utilized to allow the inductive "flyback" current to flow. In this case, both transistors are NMOS transistors. This requires a high frequency switched capacitor voltage converter providing a UPAH signal to the gate of upper drive transistor MANU. Signal UPA is coupled through an inverter to produce a UPAI signal to the voltage converter. The output of NOR gates N1 and N2, instead of controlling the upper driver, are combined with the inverse of signal DNB to provide signal DNBS to the lower driver MBND.

Not shown in FIG. 5 are: transistor MAND and MCND (and associated DNA and DNC drive logic) for coupling nodes A and C, respectively, to VRS, similar to MBND; and transistor MBNU and MCNU (and associated VPB and VPC voltage conversion circuitry) for coupling nodes B and C, respectively, to VM, similar to MANU.

Figure 6:
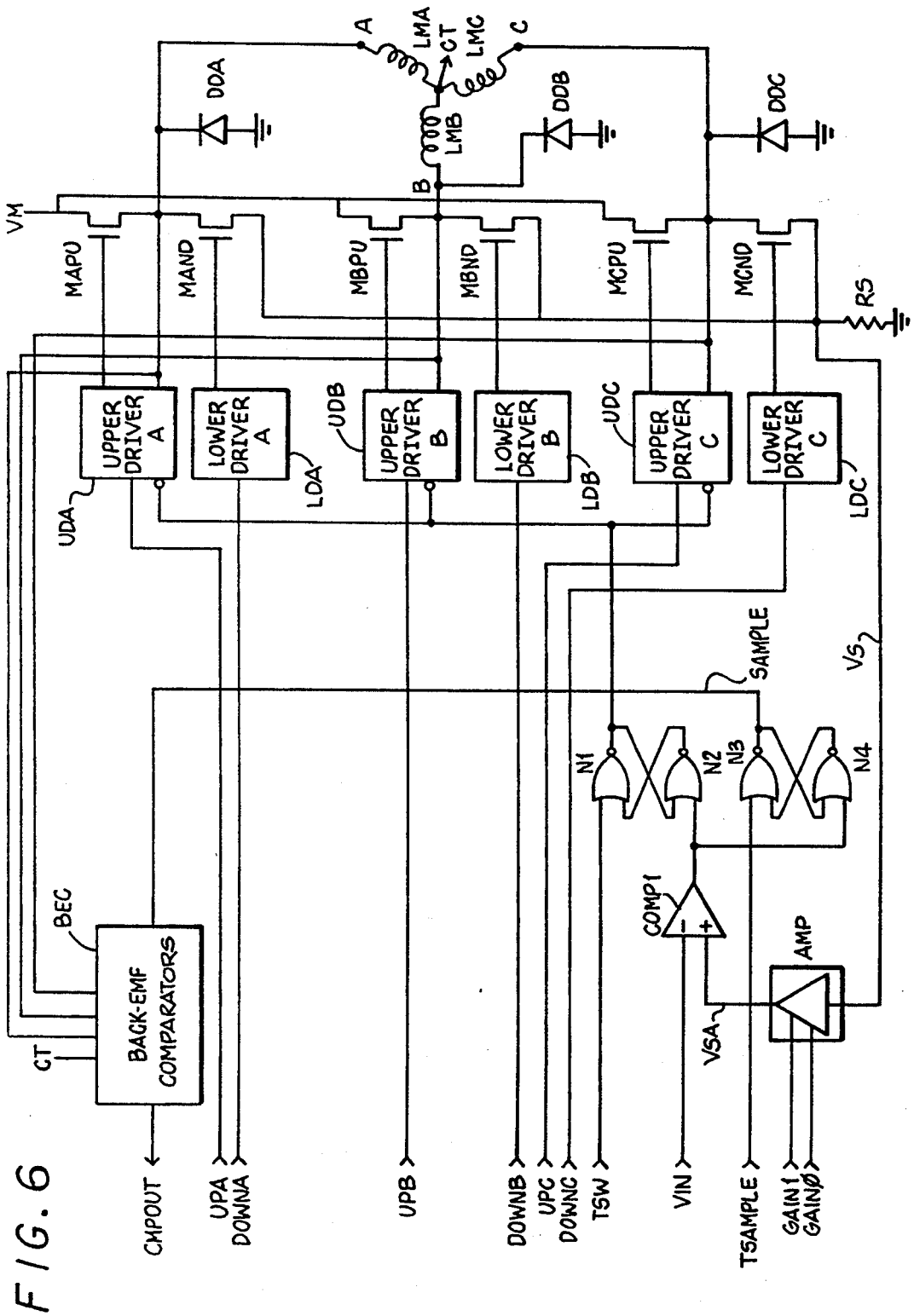
FIG. 6 is a diagram illustrating an alternate embodiment of the present invention with PWM switching occurring at the upper switching devices.

An alternate embodiment of the present invention with PWM switching occurring at the upper switching devices is illustrated in FIG. 6. To illustrate the use of the present invention with a multi-pole motor, a three pole motor is shown in FIG. 6. The motor includes windings LMA, LMB, and LMC. Connections to the motor may be achieved at nodes A, B, C, and CT.

Also illustrated in FIG. 6 are flyback diodes DDA, DDB, and DDC. Three upper MOSFET's, MAPU, MBPU and MCPU, are illustrated. Three lower MOSFET's, MAND, MBND and MCND, are also illustrated.

FIG. 6 also shows three upper drivers: upper driver A (UDA), upper driver B (UDB), and upper driver C (UDC), and three lower drivers: lower driver A (LDA), lower driver B (LDB), and lower driver C (LDC). FIG. 6 also shows back EMF comparators (BEC), additional amplifier (AMP), comparator (COMP1), and logic circuitry, and various inputs and outputs, as well as sensing resistor RS.

One end of each of motor windings LMA, LMB, and LMC is coupled to node CT. The other end of motor winding LMA is coupled to node A. The other end of motor winding LMB is coupled to node B. The other end of motor winding LMC is coupled to node C. The cathode end of flyback diode DDA is coupled to node A. The cathode end of flyback diode DDB is coupled to node B. The cathode end of flyback diode DDC is coupled to node C. The anode ends of diodes DDA, DDB, and DDC are coupled to ground. Flyback diodes DDA, DDB, and DDC may be fabricated on an integrated circuit along with the other control circuitry, or may be in the form of discrete devices adjunct to the integrated circuit.

Voltage supply VM is coupled to the drain terminals of MOSFET's MAPU, MBPU, and MCPU. The source terminal of MOSFET MAPU is coupled to node A and to the drain terminal of MOSFET MAND. The source terminal of MOSFET MBPU is coupled to node B and to the drain terminal of MOSFET MBND. The source terminal of MOSFET MCPU is coupled to node C and to the drain terminal of MOSFET MCND. The source terminals of each of MOSFET's MAND, MBND, and MCND are coupled to the first terminal of resistor RS. The second terminal of resistor RS is coupled to ground. The first terminal of resistor RS is also coupled to the input of amplifier AMP. Node A is also coupled to upper driver A (UDA) and to back-EMF comparators BEC. Node B is also coupled to upper driver B (UDB) and back-EMF comparators BEC. Node C is also coupled to upper driver C (UDC) and back-EMF comparators BEC. Node CT is coupled to back-EMF comparators BEC. The upper driver circuits UDA, UDB and UDC incorporate a voltage conversion circuit (as shown in FIG. 5 previously) to properly drive the gates of the NMOS output transistors MAPU, MBPU and MCPU.

The gate terminal of MOSFET MAPU is coupled to upper driver A (UDA). The gate terminal of MOSFET MAND is coupled to lower driver A (LDA). The gate terminal of MOSFET MBPU is coupled to upper driver B (UDB). The gate terminal of MOSFET MBND is coupled to lower driver (LDB). The gate terminal of MOSFET MCPU is coupled to upper driver C (UDC). The gate terminal of MOSFET MCND is coupled to lower driver C (LDC). Although the switching devices of this embodiment are MOSFET's, other switching devices, such as Darlington transistors, may be used in place of the MOSFET's. Further, upper drivers MAPU, MBPU and MCPU can be of P-channel type with the use of appropriate upper driver circuitry.

Inputs GAIN0 and GAIN1 are coupled to amplifier AMP. The output of amplifier AMP is coupled to the non-inverting input of comparator COMP1. Input VIN is coupled to the inverting input of comparator COMP1.

Input TSW is coupled to the first input of NOR gate N1. The output of nor gate N1 is coupled to the first input of NOR gate N2. The output of NOR gate N2 is coupled to the second input of NOR gate N1. Thus, NOR gates N1 and N2 form a flip-flop circuit.

Input TSAMPLE is coupled to the first input of NOR gate N3. The output of NOR gate N3 is coupled to the first input of NOR gate N4. The output of NOR gate N4 is coupled to the second input of NOR gate N3. Thus, NOR gates N3 and N4 form a flip-flop circuit.

The output of comparator COMP1 is coupled to the second input of NOR gate N2 and to the second input of NOR gate N4. The output of NOR gate N1 is coupled to upper driver A (UDA), upper driver B (UDB), and upper driver C (UDC). The output of NOR gate N3 is coupled to node SAMPLE and to back-EMF comparators BEC. Back-EMF's comparators BEC produce output CMPOUT which is coupled to external circuitry. Inputs UPA, DOWNA, UPB, DOWNB, UPC, and DOWNC are derived from external circuitry. Input UPA is coupled to upper driver A (UDA). Input DOWNA is coupled to lower driver A (LDA). Input UPB is coupled to upper driver B (UDB). Input DOWNB is coupled to lower driver B (LDB). Input UPC is coupled to upper driver C (UDC). Input DOWNC is coupled to lower driver C (LDC).

In the embodiment of FIG. 6, MOSFET's MAPU, MAND, MBPU, MBND, MCPU and MCND control current through motor windings LMA, LMB and LMC. External control circuitry activates signals UPA, DOWNA, UPB, DOWNB, UPC and DOWNC to cause nodes A, B and C of the motor to be coupled to the motor power supply, which includes supply voltage VM and ground. The external control circuitry provides the proper activation sequence to ensure motor commutation.

When the external control circuitry activates signal DOWNA, lower driver A (LDA) applies a voltage to the gate terminal of MOSFET MAND, causing MOSFET MAND to couple node A to ground through resistor RS. Similarly, when the external control circuitry activates signal DOWNB, lower driver B (LDB) applies a voltage to the gate terminal of MOSFET MBND, causing MOSFET MBND to couple node B to ground through resistor RS. In the same manner, when the external control circuitry activates signal DOWNC, lower driver C (LDC) applies a voltage to the gate terminal of MOSFET MCND, causing MOSFET MCND to couple node C to ground through resistor RS. Thus, the external control circuitry can cause the circuitry of FIG. 6 to selectively couple nodes A, B and C to ground. Any number of the nodes may be coupled to ground simultaneously, as required for proper motor operation.

In the linear mode, when the external control circuitry activates control signal UPA, upper driver a (UDA) applies a voltage to the gate terminal of MOSFET MAPU, causing MOSFET MAPU to couple node A to supply voltage VM. Similarly, in the linear mode, when the external control circuitry activates signal UPB, upper driver B (UDB) applies a voltage to the gate terminal of MOSFET MBPU, causing MOSFET MBPU to couple node B to supply voltage VM. In the same manner, when operating in the linear mode, the activation of control signal UPC by the external control circuitry causes upper driver C (UDC) to apply a voltage to the gate terminal of MOSFET MCPU, causing MOSFET MCPU to couple node C to supply voltage VM. Thus, in the linear mode, the external control circuitry can cause any or all of nodes A, B and C to be coupled to supply voltage VM by the circuitry of FIG. 6.

When the external control circuitry activates any of signals DOWNA, DOWNB or DOWNC, at least one of nodes A, B or C is coupled to ground through resistor RS. By coupling these nodes to ground through resistor RS, current is allowed to flow through resistor RS to ground. When current flows through a resistor, a voltage drop is created across the resistor, according to Ohms Law. Thus, the voltage at the input to amplifier AMP is proportional to the current flowing through resistor RS. The gain of amplifier AMP may be altered by changing the control signals GAIN0 and GAIN1. Adjustment of the gain of amplifier AMP allows use of various types of motors and MOSFET's, as well as various values of resistor RS. A typical range of adjustment of the gain of amplifier AMP is from 5 to 30, although the present invention may be practiced With other values. The amplified voltage from the output of amplifier AMP appears at the non-inverting input of comparator COMP1. Thus, the voltage present at the non-inverting input of comparator COMP1 is proportional to the current through resistor RS and allows measurement of the current through motor windings LMA, LMB and LMC.

Comparator COMP1 compares the voltage at its non-inverting input with input VIN, which is present at its inverting input. Input VIN is used to set a threshold that is exceeded when the motor current is greater than a certain value. When the voltage representing the current through the motor exceeds the voltage of input VIN, comparator COMP1 changes state. When the output of comparator COMP1 changes state, the two flip-flops which include NOR gates N1, N2, N3 and N4 change state.

To provide automatic PWM operation, pulses having a width TW and a period TP, as illustrated in waveform 301 of FIG. 3, are applied to input TSW. The pulses at input TSW cause the flip-flop, which includes NOR gates N1 and N2, to change state, causing the signal at the output of NOR gate N1 to become active. This active signal enables upper drivers UDA, UDB and UDC. With the upper drivers enabled, an active signal on input UPA, UPB or UPC will turn on MOSFET MAPU, MBPU or MCPU, respectively. Thus, one of motor nodes A, B or C is coupled to supply voltage VM. Depending on which one of the MOSFET's, MAND, MBND or MCND, is turned on, current begins to flow through motor winding LMA, LMB or LMC, respectively.

Since the voltage through an inductor is described by the equation $V = L\,di/dt$, the current through the motor windings in response to a step in the supply voltage does not increase to its full value instantaneously, but ramps up linearly over time. Thus, the voltage at the non-inverting input of comparator COMP1 also increases linearly over time after the supply voltage is first coupled to the motor windings. If, as the current through the motor windings increases, the voltage at the non-inverting input of comparator COMP1 exceeds the voltage of input VIN, the output of comparator COMP1 changes state, causing the flip-flop that includes NOR gates N1 and N2 to change state, deactivating the output of NOR gate N1. When the output of NOR gate N1 is deactivated, upper drivers UDA, UDB and UDC are disabled, causing the active MOSFET (MAPU, MBPU or MCPU) to turn off, disconnecting the motor from supply voltage VM. When the motor is disconnected from supply voltage VM, the current through the motor windings can no longer increase.

Flyback diodes DDA, DDB and DDC provide a path for the current in motor windings LMA, LMB and LMC to continue to flow after MOSFET MAPU, MBPU or MCPU has been turned off. As current flows through flyback diodes DDA, DDB or DDC and the energy stored in the motor windings is dissipated, the current through the motor windings gradually decreases, resulting in a gradually decreasing voltage across resistor RS. As the voltage across resistor RS decreases, the voltage at the non-inverting input of comparator COMP1 falls below the voltage at input VIN, and comparator COMP1 changes back to its original state. After time period TP has elapsed, another pulse is applied to input signal TSW, starting a new PWM cycle, and causing the above process to repeat.

In order to allow back-EMF sensing for commutation control, a pulse is applied at input TSAMPLE after a delay of TD has elapsed since the application of the pulse on input signal TSW. The pulse applied to input signal TSAMPLE has a duration TS and is illustrated in waveform 302 of FIG. 3. The pulse at input signal TSAMPLE causes the flip-flop that includes NOR gates N3 and N4 to change state. When this flip-flop changes state, the signal SAMPLE becomes active. The signal SAMPLE is applied to back-EMF comparators BEC and defines the time window, during which valid back-EMF comparison may occur. When the current through resistor RS increases to the point where voltage at the non-inverting input of comparator COMP1 exceeds the voltage of input VIN, the signal at the output of comparator COMP1 changes state, causing the flip-flop that includes NOR gates N3 and N4 to change state, thus deactivating signal SAMPLE.

Figure 7:
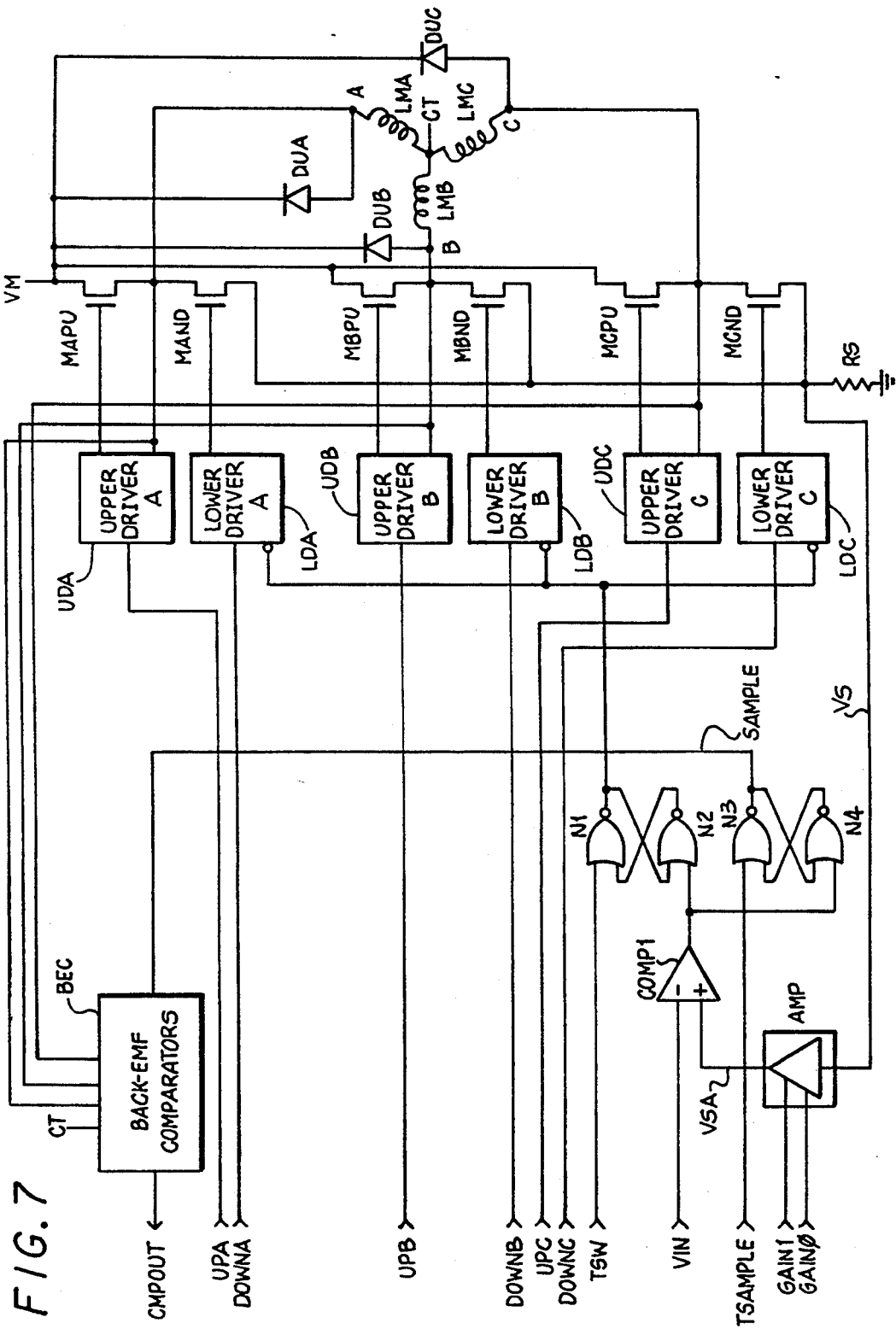
FIG. 7 is a diagram illustrating an alternate embodiment of the present invention with PWM switching occurring at the lower switching devices.

An alternate embodiment of the present invention with PWM switching occurring at the lower switching devices is illustrated in FIG. 7. FIG. 7 shows three motor windings, LMA, LMB, and LMC. Also shown are three flyback diodes, DUA, DUB, and DUC. FIG. 7 also shows three upper switching devices, MAPU, MBPU, and MCPU, and three lower switching devices, MAND, MBND, and MCND. FIG. 7 also includes resistor RS. Also shown are upper driver A (UDA), upper driver B (UDB), upper driver C (UDC), lower driver A (LDA), lower driver B (LDB), and lower driver C (LDC). FIG. 7 also shows back-EMF comparators BEC, amplification (AMP), comparison (COMP1), and logic circuitry, and various inputs and outputs.

One terminal from each of motor windings LMA, LMB, and LMC is coupled to node CT. The other terminal of motor winding LMA is coupled to node A. The other terminal of motor winding LMB is coupled to node B. The other end of motor winding LMC is coupled to node C. The anode terminal of flyback diode DUA is coupled to node A. The anode terminal of flyback diode DUB is coupled to node B. The anode terminal of flyback diode DUC is coupled to node C. The cathode terminals of flyback diodes DUA, DUB, and DUC are coupled to supply voltage VM. Supply voltage VM is coupled to the drain terminals of switching devices MAPU, MBPU, and MCPU. The source terminal of switching device MAPU is coupled to node A and to the drain terminal of switching device MAND. The source terminal of switching device MBPU is coupled to node B and to the drain terminal of switching device MBND. The source terminal of switching device MCPU is coupled to node C and to the drain terminal of switching device MCND. The source terminals of switching devices MAND, MBND, and MCND are coupled to the first terminal of resistor RS. The second-terminal of resistor RS is coupled to ground. Node A is also coupled to upper driver A (UDA), and back-EMF comparators BEC. Node B is also coupled to upper driver B (UDB) and back-EMF comparators BEC. Node C is also coupled to upper driver C (UDC) and back-EMF comparators BEC. The first terminal of resistor RS is also coupled to the input of amplifier AMP. Node CT is coupled to back-EMF comparators BEC.

Although switching devices MAPU, MBPU, MCPU, MAND, MBND, and MCND are shown implemented as MOSFET's, other switching devices, such as Darlington transistors may be used in place of the MOSFET's.

Inputs GAIN0 and GAIN1 are coupled to amplifier AMP. The output of amplifier AMP is coupled to the non-inverting input of comparator COMP1. Input VIN is coupled to the inverting input of comparator COMP1. Input TSW is coupled to the first terminal of NOR gate N1. The output of NOR gate N1 is coupled to the first input of NOR gate N2. The output of NOR gate N2 is coupled to the second input of NOR gate N1. Thus, NOR gates N1 and N2 form a flip-flop circuit.

Input TSAMPLE is coupled to the first input of NOR gate N3. The output of NOR gate N3 is coupled to the first input of NOR gate N4. The output of NOR gate N4 is coupled to the second input of NOR gate N3. Thus, NOR gates N3 and N4 form a flip-flop circuit.

The output of comparator COMP1 is coupled to the second input of each of NOR gates N2 and N4. The output of NOR gate N1 is also coupled to lower driver A (LDA), lower driver B (LDB), and lower driver C (LDC). The output of NOR gate N3 is coupled to node SAMPLE and to back-EMF comparators BEC. Back-EMF comparators BEC produce output CMPOUT, which is coupled to external circuitry.

Input UPA is coupled to upper driver A (UDA). Input DOWNA is coupled to lower driver A (LDA). Input UPB is coupled to upper driver B (UDB). Input DOWNB is coupled to lower driver B (LDB). Input UPC is coupled to upper driver C (UDC). Input DOWNC is coupled to lower driver C (LDC). Inputs GAIN0, GAIN1, VIN, TSW, TSAMPLE, UPA, DOWNA, UPB, DOWNB, UPC, and DOWNC may be derived from external circuitry.

The operation of the embodiment illustrated in FIG. 7 is similar to that of the embodiment illustrated in FIG. 6. External control circuitry provides signals UPA, DOWNA, UPB, DOWNB, UPC and DOWNC to provide proper commutation of motor windings LMA, LMB and LMC. The external control circuitry may cause the motor to operate in either a bipolar or unipolar mode. Bipolar operation is achieved by activating the upper driver of one motor winding and the lower driver of a different motor winding. By applying the motor supply voltage between node CT and the nodes A, B and C in sequence, the external control circuitry can affect unipolar operation of the motor.

For linear mode operation, the external control circuitry activates control signals UPA, UPB and UPC in sequence, causing upper drivers UDA, UDB and UDC to turn MOSFET's MAPU, MBPU and MCPU fully on (to their minimum resistance) in the proper sequence. When not turned on, these MOSFET's are non-conducting. The external circuitry also drives control signals DOWNA, DOWNB and DOWNC to cause lower drivers LDA, LDB and LDC to control MOSFET's MAND, MBND and MCND so that they act as controlled current sources. During the states of the commutation cycle when these MOSFET's are not activated, they are non-conducting. Lower drivers LDA, LDB and LDC provide controlled gate voltages to MOSFET's MAND, MBND and MCND based on comparison of voltage VS across resistor RS with an input voltage. The difference between the voltage VS and the input voltage determines the gate voltage of the MOSFET's.

In the PWM mode, PWM pulses occur at a higher frequency than the change of commutation states. The PWM activity will occur regardless of commutation and is independent of the commutation activity. In FIG. 7, the signals TSW and TSAMPLE are provided by an external time-base circuit. The signal TSW is illustrated by waveform 301 of FIG. 3 and has a period of TP and a width of TW. When the TSW pulse is received by the flip-flop that includes NOR gates N1 and N2, the output of NOR gate N1 becomes active, causing lower drivers LDA, LDB and LDC to apply voltages to the gates of MOSFET's MAND, MBND and MCND that result in these MOSFET's being fully turned on (to their minimum resistance). As the external control circuitry sequentially couples nodes A, B and C to supply voltage VM through MOSFET's MAPU, MBPU or MCPU, or alternatively, couples node CT to supply voltage VM through an external MOSFET (not shown), the motor windings are coupled to supply voltage VM. When a pulse occurs on control signal TSW and causes one or more of MOSFET's MAND, MBND and MCND to be turned on, a circuit is completed from supply voltage VM through the motor windings and through resistor RS to ground. Thus, current begins to flow through the motor windings and through resistor RS.

Since the current through an inductor is characterized by the equation $V = L \, di/dt$, the current through the inductor does not increase instantly to its maximum value after the voltage has been turned on, but increases linearly over time. As the current through the motor windings increases, the current through resistor RS also increases. Since the voltage across a resistor is proportional to the current flowing through it, the voltage VS across resistor RS also increases in proportion to the current through the motor windings. Voltage VS appears at the input to amplifier AMP. Amplifier AMP is a selectable gain amplifier whose gain can be controlled by inputs GAIN0 and GAIN1. Typical gain values for amplifier AMP are between 5 and 30, although the present invention may be practiced with other values. Amplifier AMP produces an output VSA, which is an amplified version of voltage VS. Output VSA is coupled to the non-inverting input of comparator COMP1. Comparator COMP1 compares the voltage of output VSA with the voltage of input VIN. When voltage VSA exceeds voltage VIN, comparator COMP1 changes state, causing the flip-flop that includes NOR gates N1 and N2 to change state. When the flip-flop changes state, the output of NOR gate N1 is deactivated, and lower drivers LDA, LDB and LDC cause the gate voltages to MOSFET's MAND, MBND and MCND to turn off these MOSFET's (making them fully non-conducting). When MOSFET's MAND, MBND and MCND are turned off, the current through motor windings, LMA, LMB and LMC can no longer increase.

Flyback diodes DUA, DUB and DUC allow current through the motor windings to continue to flow as the energy in the motor windings is dissipated. As current flows through fly-back diodes DUA, DUB and DUC, the current gradually decreases. The rate at which the current decreases while MOSFET's MAND, MBND and MCND are off, is less than the rate at which the current increases when these MOSFET's are on. Before the current through the motor windings goes to zero, the external control circuitry applies another pulse to control signal TSW, once again coupling the motor windings to supply voltage VM and causing the current to increase. By not allowing the current to increase or decrease below certain limits, a method of current control is provided.

In order to provide proper commutation control, back-EMF sensing may be used. While operating in the PWM mode, care must be taken to ensure that back-EMF sensing occurs at the proper time. External control circuitry applies a pulse to control signal TSAMPLE after a delay of duration TD has elapsed since a pulse was applied to control signal TSW. The pulse applied to control signal TSAMPLE is illustrated in waveform 302 of FIG. 3. The pulse on control signal TSAMPLE causes the flip-flop that includes NOR gates N3 and N4 to change state, causing signal SAMPLE to become active. While signal SAMPLE is active, back-EMF comparators BEC can provide valid back-EMF comparison and produce output CMPOUT. When the voltage at node VSA exceeds the voltage at input VIN, comparator COMP1 changes state, causing the flip-flop that includes NOR gates N3 and N4 to change state, resulting in signal SAMPLE becoming inactive. When signal SAMPLE is inactive, back-EMF comparators BEC are inhibited from producing back-EMF comparisons.

Thus, a method for providing control of current through an inductive load with automatic selection of linear or PWM modes has been provided.

I claim:

1. A circuit for controlling current through inductive loads comprising:
   current sensing means for providing a first signal substantially instantaneously proportion a current through an inductive load;

comparing means coupled to said current sensing means for comparing said first signal to a second signal and for providing a third signal which changes from a first state to a second state if the magnitude of said first signal exceeds the magnitude of said second signal;

current reducing means for reducing said current when said third signal changes from said first state to said second state;

first timing means coupled to said current reducing means for causing said current reducing means to periodically assure reconnection of said inductive load to a supply voltage, said first timing means operates at a sufficiently high frequency to provide a pulse width modulation mode for operating said inductive load;

said current reducing means comprises:
  a switch coupled to said inductive load and to said supply voltage for disconnecting said inductive load from said supply voltage, and;
  a flip-flop coupled to said comparing means and to said first timing means for controlling said switch, said flip-flop selecting between said pulse width modulation mode having variable off-time and a linear mode dependent upon said first and second signals.

2. The circuit of claim 1 wherein said current reducing means disconnects said inductive load from a supply voltage when said third signal changes from said first state to said second state.

3. The circuit of claim 1 wherein said circuit further comprises a first logic circuit coupled to said comparing means for providing a fourth signal.

4. The circuit of claim 1 wherein said current sensing means comprises a resistive element and amplifying means.

5. The circuit of claim 4 wherein said amplifying means has variable gain.

6. The circuit of claim 1 wherein said current reducing means further comprises a logic circuit coupled to said flip-flop and to said switch for receiving a fifth signal and for causing said switch to disconnect said inductive load from said supply voltage independent of said third signal.

7. The circuit of claim 6 further comprising a filming control circuit for controlling the timing of a back-electromotive-force sample, wherein said timing control circuit is receptive to said third signal and to a sixth signal from second timing means.

8. The circuit of claim 6 wherein said pulse width modulation mode is of a fixed maximum pulse frequency and a variable pulse duration.

9. An apparatus for controlling current through inductive loads comprising:
  current sensing means for generating a current sense signal dependent upon a load current through an inductive load;
  comparing means coupled to said current sensing means and an input signal for generating a comparison signal dependent upon said current sense signal;
  switching means coupled to said inductive load and a supply voltage;
  current control means coupled to said comparing means and said switching means for operating said apparatus in linear or pulse width modulation mode dependent upon said current sense signal and a first timing signal, said pulse width modulation mode having a variable off-time duration; and,
  sample generation means coupled to said comparing means and a second timing signal for producing a sample signal dependent upon said comparison signal.

10. The apparatus of claim 9 wherein said switching means comprises:
  a transistor for coupling said inductive load to said supply voltage; and,
  a diode coupled to said transistor for decreasing said load current through said inductive load when said transistor is disabled.

11. The apparatus of claim 9 wherein said current sensing means comprises:
  a resistive element; and, amplifying means.

12. The apparatus claim 11 wherein said amplifying means has variable gain.

13. The apparatus of claim 9 wherein said current control means comprises a flip-flop coupled to said first timing signal and to said switching means, said flip-flop for receiving said comparison signal for disconnecting said inductive load from said supply voltage.

14. The circuit of claim 9 wherein said sample generating means controls the timing of a back-electromotive-force sample.

15. The circuit of claim 9 wherein said first timing signal provides a sufficiently high frequency to said current control means for providing said pulse width modulation mode.

* * * * *

UNITED STATES PATENT AND TRADEMARK OFFICE
CERTIFICATE OF CORRECTION

PATENT NO. : 5,406,150
DATED : April 11, 1995
INVENTOR(S) : AUSTIN, Charles C.

It is certified that error appears in the above-identified patent and that said Letters Patent is hereby corrected as shown below:

On the title page, please add:

--[73] Assignee: Silicon Systems, Inc., Tustin, California.--

Signed and Sealed this

Seventh Day of May, 1996

Attest:

BRUCE LEHMAN

Attesting Officer

Commissioner of Patents and Trademarks